United States Patent [19]

Gajewski

[11] Patent Number: 5,340,149

[45] Date of Patent: Aug. 23, 1994

[54] DOOR ASSEMBLY WITH INTEGRAL TETHER

[75] Inventor: Gerard H. Gajewski, Dover, N.H.

[73] Assignee: Davidson Textron Inc., Dover, N.H.

[21] Appl. No.: 173,126

[22] Filed: Dec. 27, 1993

[51] Int. Cl.⁵ ............................................. B60R 21/16
[52] U.S. Cl. ................... 280/732; 280/728 B
[58] Field of Search ............... 280/728 B, 732, 743 R, 280/743 A, 728 R

[56] References Cited

U.S. PATENT DOCUMENTS

| | | | |
|---|---|---|---|
| 3,756,617 | 9/1973 | Brown | 280/150 |
| 4,834,421 | 5/1989 | Kösher et al. | 280/732 |
| 4,842,300 | 6/1989 | Ziomek et al. | 280/732 |
| 4,925,209 | 5/1990 | Sakurai | 280/743 |
| 5,072,767 | 12/1991 | Batchelder et al. | 280/732 |
| 5,082,310 | 1/1992 | Bauer | 280/732 |
| 5,096,221 | 3/1992 | Combs et al. | 280/732 |
| 5,161,819 | 11/1992 | Rhodes, Jr. | 280/728 |
| 5,195,776 | 3/1993 | Sakakida et al. | 280/732 |
| 5,222,760 | 6/1993 | Rafferty | 280/728 |

FOREIGN PATENT DOCUMENTS

| | | | |
|---|---|---|---|
| 0227753 | 10/1991 | Japan | 280/728 B |
| 4208661 | 7/1992 | Japan | 280/728 A |

*Primary Examiner*—Margaret A. Focarin
*Assistant Examiner*—Christopher P. Ellis
*Attorney, Agent, or Firm*—Reising, Ethington, Barnard, Perry & Milton

[57] ABSTRACT

A separate door assembly with an outer shell, a layer of backing foam and a rigid substrate for covering an inflatable air bag system of a supplemental restraint system to protect the occupant of a vehicle, the separate door seats within an opening in an interior trim structure of a vehicle and is attached to the interior trim structure so that the whole door assembly can separate from the interior trim product during air bag deployment without delamination of the outer shell from the layer of backing foam.

8 Claims, 2 Drawing Sheets

DOOR ASSEMBLY WITH INTEGRAL TETHER

TECHNICAL FIELD

This invention relates to supplemental restraint systems and more particularly to door units that are preformed and connected in an access opening of an interior trim product and separable therefrom during deployment of an air bag through the access opening.

BACKGROUND ART

Various arrangements are provided to cover an inflatable air bag within an interior trim structure of a motor vehicle. Such interior trim structures include a panel that covers a folded air bag connected to a suitable gas generator that is activated when the vehicle is impacted.

Such arrangements are shown in various forms. In one arrangement, the folded air bag is disposed behind an interior trim panel that will break open during deployment. Examples of such arrangements are set forth in U.S. Pat. Nos. 3,756,617; 4,842,300; 5,082,310; and 5,222,760. The problem with these arrangements is that the interior trim panel must be separated along breaklines during air bag deployment. Such separation can produce undesirable delamination of an outer shell from underlying foam backing material that can cause the production of undesirable debris within the passenger compartment as the air bag deploys.

Another form of air bag closure is one in which an interior trim structure has a preformed access opening therein that is located above the folded air bag structure to allow deployment thereof from within the interior trim structure on vehicle impact. The preformed access opening is closed by a separate door assembly having an outer shell joined to a substrate that can comprise a foam backing layer and a rigid support substrate. Alternatively, the outer shell can have a less resilient outer layer and a more resilient inner layer to form a soft touch cover that overlies a relatively rigid support substrate.

Examples of these forms of prior art air bag closures is shown in U.S. Pat. Nos. 4,925,209; 5,096,221 and 5,161,819. The problem with these arrangements is that the connections between the separate door and the interior trim structure can cause delamination of the outer shell from its supporting substrate at the point of connection of the separate door structure to the interior trim panel so as to cause undesirable debris within the passenger compartment during air bag deployment. Another problem with such air bag closures is that a tether must be provided to prevent the door from impacting against an overlying windshield when the supplemental restraint system is located to protect a passenger side occupant of the vehicle.

A particular problem with separate door designs that require tethers is that the tethers have a direct mechanical connection to the door assembly. Such connections create a substantial strain on the point at which the tether is connected to the door when the door is fully opened. If the tether connection separates there is an increased possibility of windshield breakage.

SUMMARY OF THE INVENTION

The present invention is embodied in a supplemental restraint system located within an interior trim structure of a vehicle. Such systems include an inflatable air bag that is deployable beneath a preformed separate door assembly located within a preformed access opening within the interior trim structure. When the air bag impacts on the underside of the door assembly the door assembly is lifted away from the interior trim structure along the full perimeter of the door assembly and moved a distance sufficient to form an opening between the door assembly and the interior trim structure through which the inflated air bag is deployed to protect a passenger. In one embodiment the separate door assembly includes a thin plastic shell that is backed by a layer of urethane foam material having a rigid insert or substrate connected thereto. The thin plastic shell has integral loops formed on two sides and/or along the "hinge" (or forward) side thereof that are located inwardly of opposite edges of the door assembly to a point interiorly of the interior trim structure. The loops have an extended length that will allow the door to lift away from the interior trim structure about the full perimeter of the preformed door assembly during air bag deployment. When the preformed door assembly is fully opened, the loops are tensioned to press the thin plastic shell against the preformed separate door so as to prevent delamination of the thin plastic shell from the door.

An object of the present invention is to eliminate the need for a separate mechanical attachments between a tether and flange portions on a separately preformed door assembly seated within a interior trim panel of a supplemental restraint system including an air bag deployable against the door to lift it from the interior trim panel completely around the perimeter thereof as the doors is opened during deployment of the air bag.

A further object of the present invention is to provide a door assembly for a supplemental restraint system wherein the door is seated within an interior trim structure to prevent access to an inflatable air bag and wherein the door assembly includes an integral tether that eliminates the need for a separate mechanical attachments between a tether and flange portions on the door.

A feature of the present invention is to provide such a door assembly having an integral tether formed on side portions of a thin outer shell and wherein the integral tethers are connected to the interior trim structure at the underside thereof on a rigid structure of the interior trim structure so that the door assembly can be lifted from the interior trim structure following air bag deployment without causing delamination of the thin outer shell from the remainder of the separately preformed door assembly.

A further feature of the present invention is to provide such a door assembly wherein the integral tether is a flap stowed as a reverse loop located interiorly of the interior trim structure and wherein the reverse loop extends to a length that will cause the door assembly to lift away from the interior trim structure completely around the perimeter thereof a distance that will permit unrestricted deployment of the air bag from the interior trim structure.

Still another feature of the present invention is to locate such flaps on the door assembly and to connect the flaps to an anchor point such that air bag deployment will cause said flaps to be tensioned to press the thin plastic shell against the door assembly to prevent delamination of the thin plastic shell from the door assembly.

The invention will now be described by way of the following embodiments and with reference to the accompanying drawings, with it being understood that other advantages and a more complete understanding of the invention will be apparent to those skilled in the art from the succeeding detailed description of the invention and accompanying drawings wherein:

DETAILED DESCRIPTION OF THE PREFERRED EMBODIMENT

Figure 1:
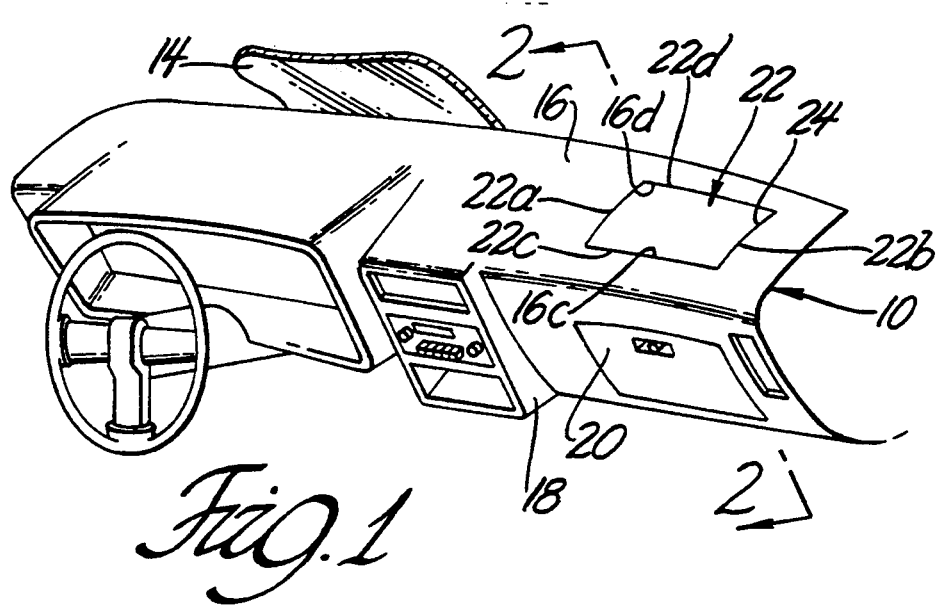
FIG. 1 is a perspective view of an instrument panel of a vehicle including the door assembly of the present invention.

Referring to the Figures, wherein like numerals indicate like or corresponding parts through out the view, a vehicular instrument panel structure 10 is illustrated in FIG. 1. The instrument panel structure 10 is exemplary of an interior trim structure for a vehicle in which a supplemental restraint assembly 12 can be hidden from a passenger in the vehicle.

The instrument panel structure is located rearwardly and below a windshield 14. In the illustrated arrangement the instrument panel structure 10 includes an upper panel 16 and a console 18 that extends downwardly from the instrument panel structure 10 on one side of a glove box door 20. The supplemental restraint assembly 12 is thus located to protect a front seat passenger of the vehicle.

The supplemental restraint assembly 12 includes a preformed, separate door structure 22 of the present invention seated within an opening 24 formed in the upper panel 16 immediately in front of the front seat passenger. The door structure 22 covers an inflatable air bag unit 26 including an air bag 28 that is folded and stowed in an air bag container 30 and connected to a gas generator 32. The gas generator 32 has an igniter 34 connected to a control system 36 that is responsive to a vehicle impact to cause the inflatant material in the gas generator 32 to be released into the air bag 28 for purposes to be described.

Figure 2:
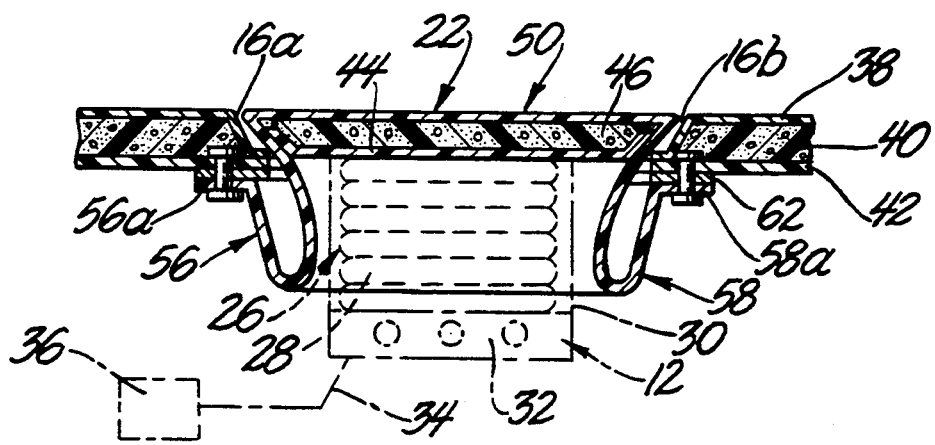
FIG. 2 is an enlarged, sectional view of the door assembly of the present invention taken along the line 2—2 of FIG. 1 looking in the direction of the arrows.
Figure 3:
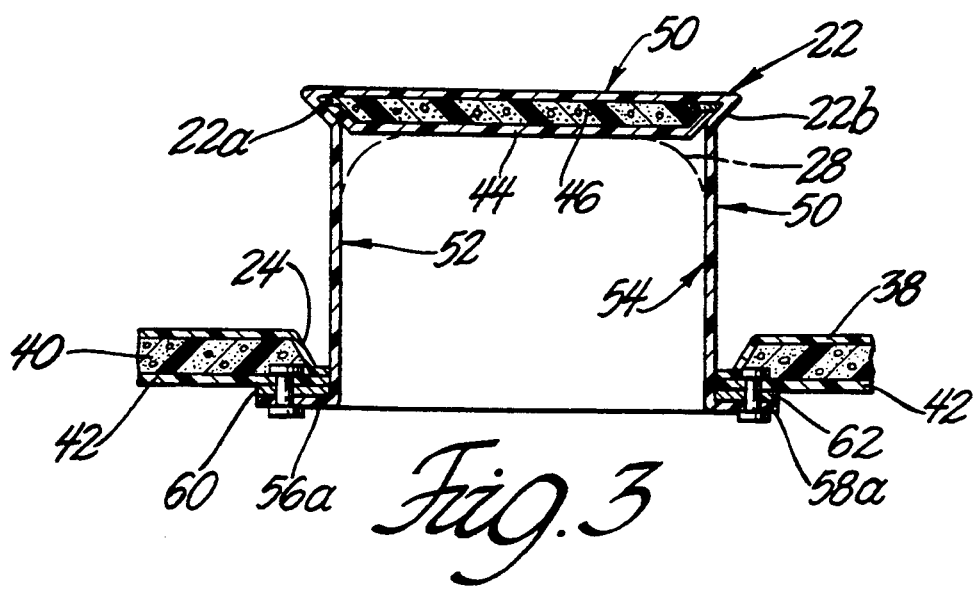
FIG. 3 is a view like FIG. 2 showing the door assembly in an open position.

In the embodiment of FIGS. 1-3, the instrument panel includes an outer shell 38 that covers a backing layer 40 that is supported on a retainer substrate, generally indicated at 42, having a substantially rigid construction and fabricated from either metal or a plastic material. A suitable high strength injection molded plastic such as Dow Pulse, ARCO Dylark, GE Noryl, can be used to form the retainer substrate. The backing layer 42 can be urethane foam material or PVC foam, polyester foam, polystyrene foam.

In the illustrated arrangement the outer shell 38 can be rotationally molded, blow molded, cast or vacformed from a range of polymeric compounds including polyvinyl chloride (PVC), blends of polyvinyl chloride; thermoplastic or thermoset polyurethane; thermoplastic olefins and the like.

The door structure 22 includes an insert 44 of a rigid material such as steels aluminums rigid plastic including compounds combining acrylonitrile, butadiene and styrene resins referred to as ABS. The substrate can be formed from ABS/PVC alloys and any other plastic material that is rigid and sufficiently strong to resist impact forces directed thereagainst when the air bag is deployed Dow Pulse, GE Lexan, GE Norvyl, ARCO Dylark, any TPO or TPE are all suitable, in addition to steel, aluminum or any malleable metal.

The insert 44 is molded within a layer 46 of backing material such as a cast layer of urethane foam or a reaction injection molded polyurethane formulation.

The layer 46 of backing material is covered by a plastic shell 50 preferably formed from a sprayable urethane formulation that can be sprayed into a heated mold to form a thin layer of material.

The plastic shell 50 includes integral side or hinge flaps 52, 54 that are folded into loops 56, 58 located interiorly of the instrument panel when the door is closed, as shown in FIG. 2. In the illustrated arrangement the door structure 22 includes outwardly converging side walls 22a, 22b and outwardly converging rear and front walls 22c, 22d that are seated within congruent surfaces 16a, 16b, 16c and 16d formed in the upper panel 16 of the interior trim structure 10. As such, the door structure 22 is normally flush with the panel 16 and covers the supplemental restraint system without impairing the view through the windshield 14 or constituting an undesirable distraction when viewed from the front passenger position.

One problem with prior preformed, separate door assemblies for supplemental restraint systems has been the manner in which they have been tethered to an anchor point within the passenger compartment. In the past the tether has required separate fasteners on the door structure. Such separate fasteners direct a concentrated force on the door structure that can produce undesirable strain and possible separation such that the door structure can swing free and cause windshield breakage.

In the present invention, the door structure 22 is secured by the integral flaps on the outer shell 50 by connecting the ends 56a, 58a of the loops 56, 58 to brackets 60, 62 on the insert 42 of the instrument panel. If desired, the loops 56, 58 can be directly fastened to the substrate 42. Attachments can be made by directly riveting, screwing, or adhering the loops 56, 58 to either the flanges or the substrate itself.

Figure 6:
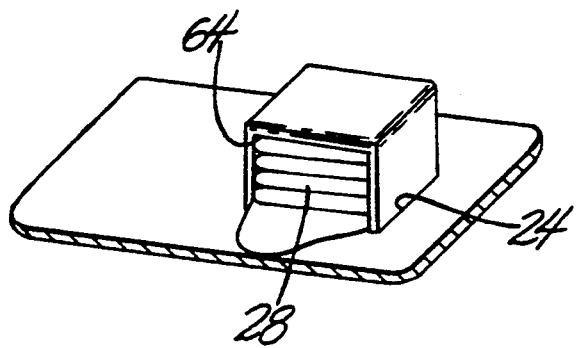
FIG. 6 is a fragmentary perspective view of the embodiment of FIG. 1-3 showing the separate door assembly in a lift-off position with a partially broken away air bag shown deployed thereunder.

By virtue of the aforedescribed structure, the door structure 22 will lift from the instrument panel (See FIGS. 2 and 6) when the air bag 28 is inflated and deployed through the opening 24. In the lift position, the door structure 22 will be raised from the instrument panel 16 and the flaps 52, 54 will be fully extended to define a rear opening 64 between the raised door structure 22 and the panel 16 as best shown in FIG. 6. The pressure of the deployed air bag 28 will act on the insert 44 to force against the outer shell 50 to cause the flaps 52, 54 to be tensioned. This in turn will press the outer shell 50 against the backing layer 46 to prevent delamination between the outer shell 50 and the rest of the door structure 22. In the case of a foam backing layers an adhesive bonding occurs between the outer shell 50 and the foam material. The tension of the flaps 52 will reduce the potential for delamination of the outer shell 50 from the foam during deployment so as to eliminate particulate debris within the passenger compartment due to break-up of structure parts of the door structure 22. Furthers the impact loading of the air bag 28 against the underside of the insert 44 will be partially absorbed and distributed at the end connections 56a, 58a.

Figure 4:
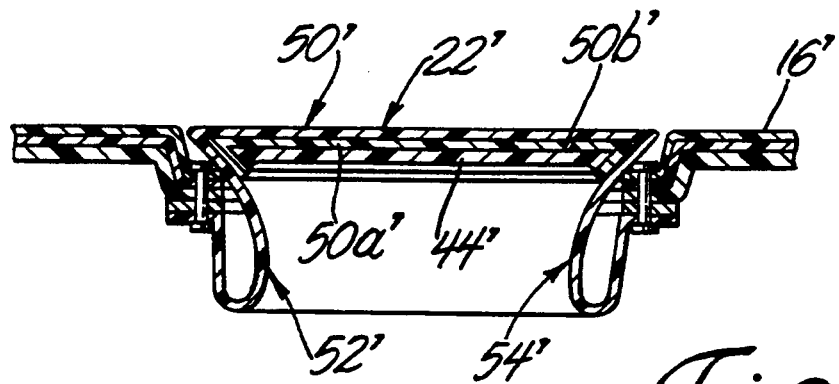
FIG. 4 is a sectional view of another embodiment of the present invention.

In the embodiment of FIG. 4 an instrument panel 16' is shown supporting a preformed, separate door structure 22' including the present invention. In this embodiment the outer shell 50' is formed with a double thickness including a solid urethane outer thickness 50'a and a urethane foam inner thickness 50'b. The outer shell 50' is directly supported on a rigid substrate member 44'. The outer shell 50' includes integrally formed side portions 52' and 54' that serve the same function as do side portions 52 and 54 in the embodiment of FIGS. 1-3. The outer thickness can also be formed of polyvinyl chloride and the inner thickness can be a layer of polyvinyl foam.

Figure 5:
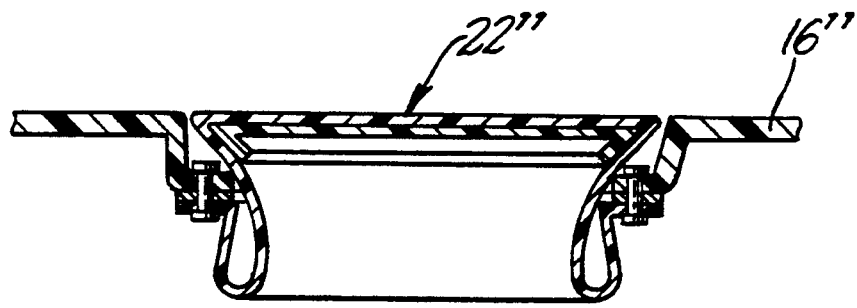
FIG. 5 is a sectional view of still another embodiment of the present invention.

In the embodiment of FIG. 5, an instrument panel 16" is shown supporting a preformed, separate door structure 22" supported in an opening formed through an upper panel 16". In this embodiment an outer shell 50" is directly connected to a rigid substrate 44".

Until the actuation of the air bags in each of the aforedescribed embodiments, the separate door structure covers the supplemental restraint system in a tamper proof manner. When the air bag is deployed the separate, preformed door structure is lifted from the panel so as to separate therefrom completely around the full perimeter of the door structure. The integrally formed tethers on the door structure will simultaneously assure complete lift off without impacting adjacent windshield or interior trim structure and without undesirable lamination of the outer shell component of such door structure.

The invention has been described in an illustrative manner, and it is to be understood that the terminology which has been used is intended to be in the nature of words of description rather than of limitation.

Obviously, many modifications and variations of the present invention in light of the teachings may be made. It is therefore, to be understood that within the scope of the appended claims, the invention may be practiced otherwise than as specifically described.

What is claimed is:

1. A preformed, separate door assembly for closing an opening in an interior trim structure of a vehicle in which an inflatable air bag assembly is housed for deployment of an inflated air bag into the passenger compartment upon vehicle impact comprising: said separate preformed door assembly including a thin plastic shell that is backed by a layer of foam material; a rigid insert or substrate connected to said thin plastic shell, said thin plastic shell having integral tethers formed on two sides thereof that are located inwardly of the interior trim structure wherein said tethers form loops which extend to form flaps that are tensioned when the preformed door assembly is fully opened so as to cause said thin plastic shell to press against said backing layer and said rigid insert so as to prevent delamination of the thin plastic shell therefrom.

2. In the assembly of claim 1, wherein said loops have an extended length that will allow the separate door assembly to lift away from the interior trim structure about the full perimeter of the separate preformed door assembly during air bag deployment.

3. In the assembly of claim 1, said interior trim structure including a rigid substrate, said integral tethers having an end thereon connected to said rigid substrate of said interior trim structure so that the door assembly can be lifted from the interior trim structure following air bag deployment without causing delamination of the thin outer shell from the remainder of the separately preformed door assembly.

4. In the assembly of claim 1, said integral tether formed as flaps stowed as reverse loops located interiorly of the interior trim structure and wherein said reverse loops extend to a length that will cause the door assembly to lift away from the interior trim structure completely around the perimeter thereof a distance that will permit unrestricted deployment of the air bag from the interior trim structure.

5. In the assembly of claim 1, including an anchor point; said flaps located on two opposite sides of the door assembly, said flaps connected to said anchor point such that air bag deployment will cause said flaps to be tensioned to press the thin plastic shell against the door assembly to prevent delamination of the thin plastic shell from the door assembly.

6. In the assembly of claim 5, said layer of foam material being selected from the group comprising polyurethane foam; polyvinyl chloride foam; polyester and polystyrene.

7. In the assembly of claim 2, said layer of foam material being selected from the group comprising polyurethane foam; polyvinyl chloride foam; polyester and polystyrene.

8. In the assembly of claim 3, said layer of foam material being selected from the group comprising polyurethane foam; polyvinyl chloride foam; and polyester and polystyrene.

* * * * *